UNITED STATES PATENT OFFICE.

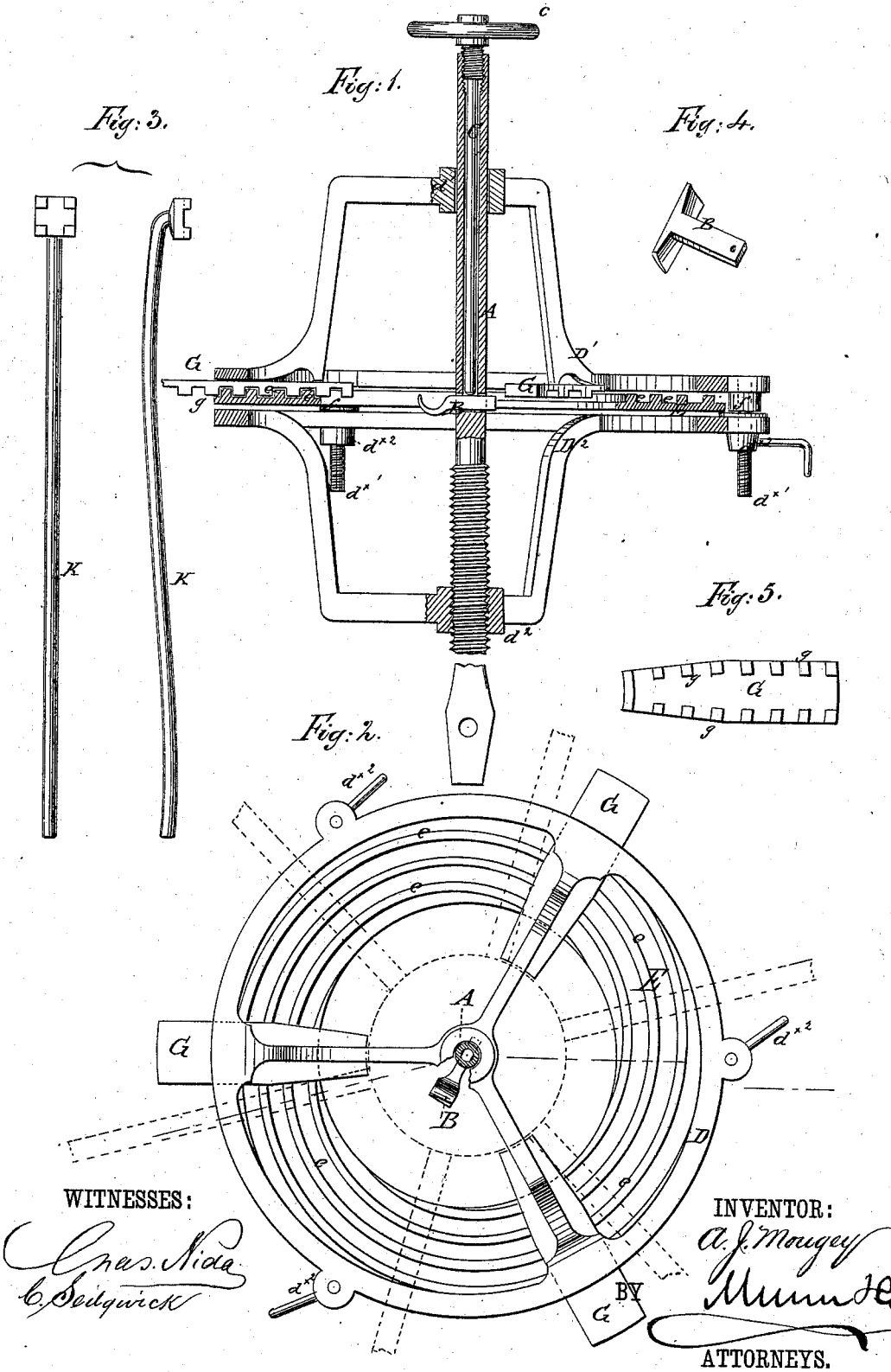

ALEXANDER J. MOUGEY, OF CARTHAGE, NEW YORK.

IMPROVEMENT IN HUB-BORING MACHINES.

Specification forming part of Letters Patent No. 219,171, dated September 2, 1879; application filed February 4, 1879.

*To all whom it may concern:*

Be it known that I, ALEXANDER JOSEPH MOUGEY, of Carthage, in the county of Jefferson and State of New York, have invented a new and useful Improvement in Hub-Boring Machines, of which the following is a specification.

My invention consists in a novel construction, arrangement, and combination of a mandrel, a pair of chucks, a series of adjustable centering-plates, and an adjustable bit or cutter, whereby provision is made for centering the work, holding it securely in position, and accurately boring the hub, all as hereinafter particularly described.

In the accompanying drawings, Figure 1 is a sectional view, parallel with the axis of the hub, of an apparatus embodying my improvements. Fig. 2 is a transverse section. Figs. 3, 4, and 5 are detail views, hereinafter referred to.

Similar letters of reference indicate corresponding parts.

A represents a mandrel, having its lower end adapted to be inserted in a recess in a work-bench, and secured therein by a bolt, so as to prevent it from turning. About one-half of the length of the mandrel, more or less, is externally screw-threaded, and the remaining portion is plain and smooth.

About midway of the length of the mandrel is a transverse slot for the reception of the shank of a boring-bit, B. From this slot upward to the upper end of the mandrel it is hollow, and the upper end of the hollow portion is provided with an internal screw-thread.

A set-screw, C, works in the hollow portion of the mandrel, being externally threaded for engagement with the internal thread at the upper end of said mandrel. The lower end of the set-screw C bears against the shank of the bit B and holds it in place, and its upper end is provided with a thumb wheel or knob, $c$, for turning it.

$D^1$ $D^2$ represent two chucks, for clamping the spokes of the wheel the hub of which is to be bored. Each of these chucks is provided with a central bearing, through which the mandrel passes, and said bearings may be of either brass or Babbitt metal. The upper bearing, $d^1$, is smooth and cylindrical, and the lower bearing, $d^2$, is internally threaded for engagement with the threaded portion of the mandrel.

The two chucks are connected together by means of screw-shanks $d^{\times 1}$ on the upper one passing through perforations in the lower one, and secured by thumb-nuts $d^{\times 2}$ on the under side of said lower one. On the screw-shanks $d^{\times 1}$ are flanged rollers $f$. Between the lower side of the upper chuck, $D^1$, and the flanges of the rollers $f$ is an annular plate, E, having on its upper surface a worm or spiral thread, $e$.

Between the upper surface of the annular plate E and the lower surface of the upper chuck, $D^1$, working in recesses or guideways in the latter, are three or more chuck-plates or centering-plates, G, for centering the hub to be bored. The lower surface of each plate G is provided with threads $g$, (see Fig. 5,) for engagement with the spiral thread $e$ on the plate E.

The operation is as follows: The lower end of the mandrel A is secured in an upright position so as not to turn, and the lower chuck, $D^2$, is placed in position thereon. The mandrel is then passed through a hole in the hub provided for the purpose, and the wheel is lowered until the spokes rest on the lower chuck, $D^2$. The upper chuck, $D^1$, is then placed in position on the mandrel above the wheel by passing the screw-shanks $d^{\times 1}$ through the perforations in the lower chuck. The annular plate E is then turned by means of a wrench, K, (see Fig. 3,) so as to cause the engagement of the spiral thread $e$ with the threads $g$, to move the centering-plates G simultaneously, and thus center the hub. The upper chuck, $D^1$, is then secured by tightening the thumb-nuts $d^{\times 2}$, so as to clamp the wheel firmly between the upper and lower chucks and annular plate. The wheel is then turned so as to cause the lower bearing, $d^2$, to descend on the screw-threaded portion of the mandrel, and as it so descends the boring is accomplished by the bit B.

Any suitable number of bits of any suitable form may be used in connection with this apparatus, and it may be used for making either tapering or cylindrical bores. A bit such as the one shown in Fig. 4 may be used for taper-boring.

The recesses in the ends of the bore of the hub for receiving a nut or the collar on the skein may be readily formed by either changing the same bit or by using a bit especially adapted for the purpose.

Having thus described my invention, I claim as new and desire to secure by Letters Patent—

1. The combination of the mandrel A, provided with an external thread, and the lower chuck, $D^2$, provided with the internally-threaded bearing $d^2$, substantially as and for the purpose shown and described.

2. The combination of the mandrel A and the chucks $D^1$ $D^2$, provided with the screw-shanks and thumb-nuts, substantially as and for the purpose herein described.

3. The combination of the chuck $D^1$, flanged rollers $f$, annular plate E, and centering-plates G, substantially as and for the purpose herein described.

4. The combination, with the mandrel A and adjustable bit B, of the set-screw C, substantially as and for the purpose herein described.

ALEXANDER JOSEPH MOUGEY.

Witnesses:
   WM. KUM,
   W. H. DELMORE.